(12) United States Patent  
Moore

(10) Patent No.: US 6,498,880 B1
(45) Date of Patent: Dec. 24, 2002

(54) FIBER OPTIC FERRULE

(75) Inventor: Andrew Moore, Broomfield, CO (US)

(73) Assignee: Picolight Incorporated, Boulder, CO (US)

( * ) Notice: Subject to any disclaimer, the term of this patent is extended or adjusted under 35 U.S.C. 154(b) by 0 days.

(21) Appl. No.: 09/281,982

(22) Filed: Mar. 31, 1999

(51) Int. Cl.[7] .............................. G02B 6/36
(52) U.S. Cl. ...................... 385/78; 385/89; 385/53; 385/65
(58) Field of Search .................... 385/53, 65, 83, 385/88–94, 125, 137, 78; 264/1.25, 1.24, 1.27

(56) References Cited

U.S. PATENT DOCUMENTS

| | | |
|---|---|---|
| 5,073,046 A | 12/1991 | Edwards et al. |
| 5,140,663 A | 8/1992 | Edwards et al. |
| 5,259,052 A | 11/1993 | Briggs et al. |
| 5,386,487 A | 1/1995 | Briggs et al. |
| 5,574,814 A | 11/1996 | Noddings et al. |
| 5,608,830 A | 3/1997 | Belenkiy et al. |
| 5,631,985 A | 5/1997 | Yamada et al. |
| 5,687,267 A * | 11/1997 | Uchida ..................... 385/89 |
| 5,712,938 A | 1/1998 | Lin et al. |
| 5,737,467 A * | 4/1998 | Kato et al. ................ 385/92 |
| 5,742,719 A | 4/1998 | Birnbaum |
| 5,743,785 A | 4/1998 | Lundberg et al. |
| 5,796,896 A | 8/1998 | Lee |
| 5,809,191 A | 9/1998 | Stevens et al. |
| 5,853,626 A * | 12/1998 | Kato ....................... 264/1.25 |
| 5,984,534 A * | 11/1999 | Elserstig et al. .......... 385/90 |
| 6,158,899 A * | 12/2000 | Arp et al. ................. 385/53 |

* cited by examiner

Primary Examiner—Frank G. Font
Assistant Examiner—Michael P. Mooney
(74) Attorney, Agent, or Firm—Jagtiani + Guttag

(57) ABSTRACT

A ferrule is constructed with a modified surface to interact with a coordinating housing. The housing is constructed to be integral with the modifications of the ferrule and to fill the recesses in the ferrule body. The coordination between housing and ferrule decreases electromagnetic interference from the ferrule.

24 Claims, 5 Drawing Sheets

FIBER OPTIC FERRULE

BACKGROUND OF THE INVENTION

1. Field of the Invention

The present invention relates generally to devices for interconnecting multiple optical fibers, and more particularly to a fiber optic ferrule with a high level of insulation from electromagnetic interference.

2. Background of the Invention

The use of optical fibers for high-speed communication and data transmission via optical signals has become well established. Modem telecommunications and data transmission systems employ numerous optical fiber signal transmission lines and it is necessary to provide connections between the optical fibers at various locations within these systems.

Various optical connectors have been used for connection of optical fibers. For instance, in FIG. 1, there is shown an optical connector 10 which comprises a rectangular-parallelpiped ferrule 12 having a contact face 14 at a front portion of ferrule 12 and positioning guide pins 16 formed at opposite sides in a transverse direction of ferrule 12, and a fiber ribbon 18 having a plurality of optical fibers 20 running in a lateral direction and mounted to a rear portion of ferrule 12. Guide pins 16 and respective optical fibers 20 are arranged in parallel with each other so that they are perpendicular to contact face 14.

At present, the above-mentioned potential applications of optical fibers are complicated by the fact that the distribution of signals such as radio frequency (RF) signals are disrupted by electromagnetic interference (EMI) which escapes from contact face 14.

As a result of the foregoing, there is a need in the art for a fiber optic ferrule with a high level of insulation from electromagnetic interference.

SUMMARY OF THE INVENTION

It is therefore an object of the present invention to provide a fiber optic ferrule which will provide a high level of insulation from electromagnetic interference.

It is a further object to provide a fiber optic ferrule with a decreased virtual aperture.

It is yet another object to provide a housing that is integral with a ferrule constructed in accordance with the invention.

It is yet another object to provide a method for making a modified ferrule.

It is yet another object to provide a method for making a housing that is integral with a modified ferrule.

In all of the above embodiments, it is an object to provide a reduction in EMI passing through the ferrule.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

Definitions

Before the present invention may be described in detail, it is necessary to define several key terms. Where the definition of terms departs from the commonly used meaning of the term, applicant intends to utilize the definitions. provided below, unless specifically indicated.

For the purposes of the present invention, the term "optical axis" refers to the "z" direction in which the optical fibers run through a ferrule.

For the Purposes of the present invention, the term "y-axis" refers to the direction vertical and perpendicular to the optical axis.

For the purposes of the present invention, the term "x-axis" refers to the direction horizontal and perpendicular to the optical axis.

For the purposes of the present invention, the term "physical aperture" refers to the surface area of a ferrule contact face. An example of the physical aperture may be seen in FIGS. 1 and 4 as element 14.

Figure 5A:
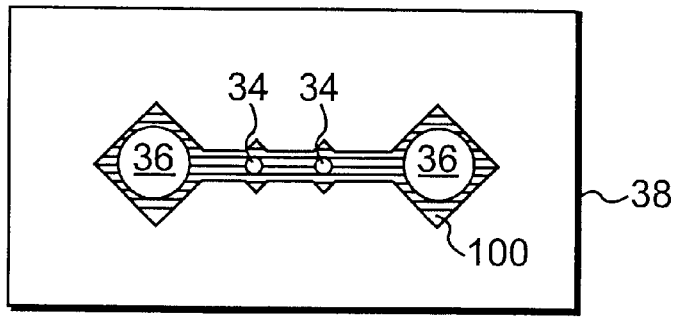
FIGS. 5A through 5C are explanatory front views of ferrules according to the present invention.
Figure 5B:
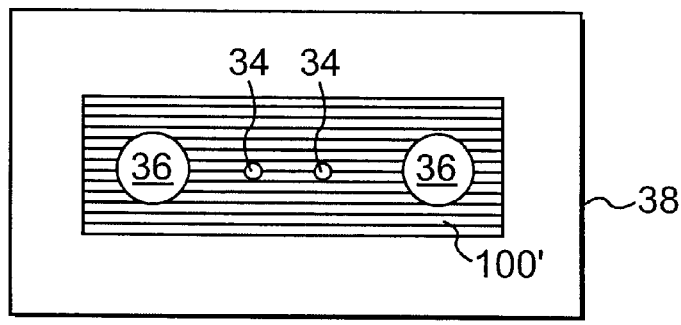
Figure 5C:
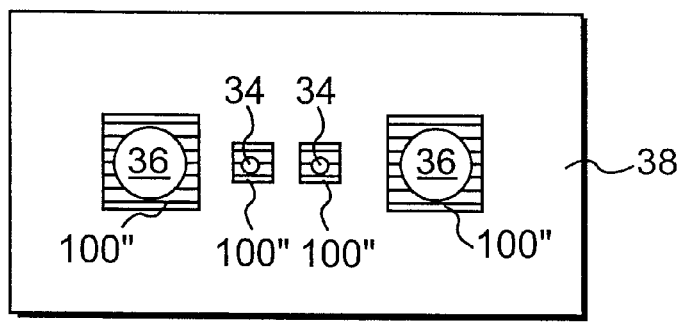

For the purposes of the present invention, the term "virtual aperture" refers to a relative open space through which RF radiation exits the ferrule after the various modifications have been made as defined by this invention. Examples of virtual apertures are illustrated in FIGS. 5A, 5B, and 5C by elements 100, 100' and 100".

For the purposes of the present invention, the term "box cut(s)" refers to a cut resulting in the removal of a portion of a ferrule body where cuts are made at approximately right angles relative to an adjacent cut in the ferrule body, but that they do not intersect fiber optic cable(s) or guide pins within the ferrule body. Examples of box cuts may be seen in FIGS. 2 and 6A as elements 32 and 120.

For the purposes of the present invention, the term "angled cut(s)" refers to a cut resulting in the removal of a portion of a ferrule body where the cuts are made at obtuse angles relative to an adjacent cut in the ferrule body, but that do not intersect fiber optic cable(s) or guide pins within the ferrule body. An example of an angled cut may be seen in FIGS. 6B and 8B as element 130.

For the purposes of the present invention, the term "differentiated serrated cut(s)" refers to cuts made in the direction of an optical axis or "z" axis of a ferrule that resemble a toothed edge of a saw and have relatively higher peaks that correspond to the presence of guide pin(s) or fiber optic cables(s) within the ferrule body. Examples of differentiated serrated cuts may be seen in FIGS. 7, 8A, and 8B as elements 140 and 146.

For the purposes of the present invention, the term "cavity cut(s)" refers to cuts made in the direction of the y-axis that proceed entirely through a ferrule, but that do not intersect the fiber optic cable(s) or guide pins within the ferrule body. An example of a cavity cut may be seen in FIG. 2 as element 32'.

For the purposes of the present invention, the term "extruding cut(s)" refers to any cut that results in the removal of a portion of a ferrule body, including, but not limited to box cuts, angled cuts, cavity cuts, and differentiated serrated cuts.

For the purposes of the present invention, the term "waveguide" is used in this application to mean any device used to channel an optical signal, at any frequency. Specific examples of waveguides include, but are not limited to: fiber-optic waveguides, planar glass, as well as crystalline and semiconductor waveguides.

The term "fiber optic cable" or "fiber optic waveguide" is used in this application to mean any waveguide utilized to guide light waves from one point to another. This definition specifically includes both single mode and multi-mode fibers as well as any waveguide having any cross-sectional shape. In addition, this term also includes any waveguide whether doped or undoped.

Description

Figure 1:
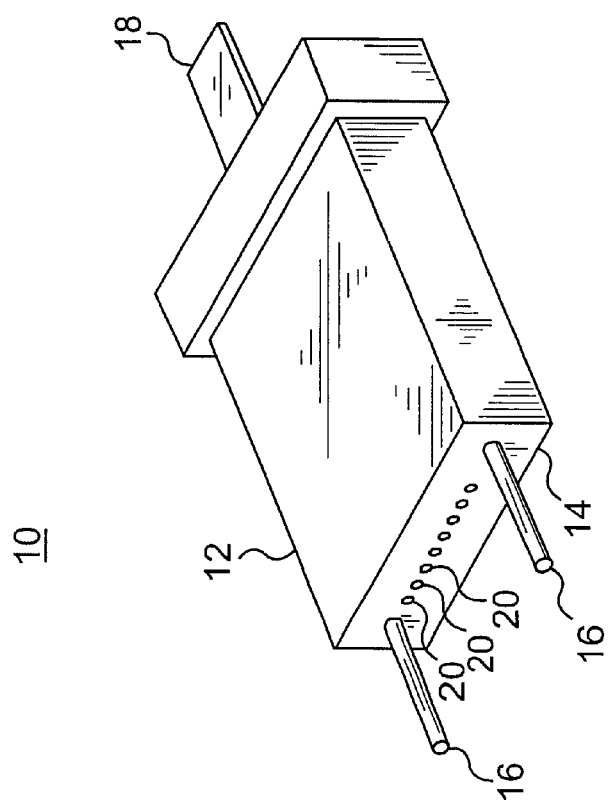
FIG. 1 is a perspective view of a prior art optical fiber cable ferrule.

With reference to FIG. 1, a ferrule 12 is attached to an end of a multi-fiber optical cable or ribbon 18 to provide, at contact face 14 of ferrule 12, a set of spaced-apart aligned end facets 20 of fibers in multi-fiber cable 18. A pair of guide pins 16 extend parallel to one another and orthogonally outward from contact face 14 of ferrule 12.

Figure 4:
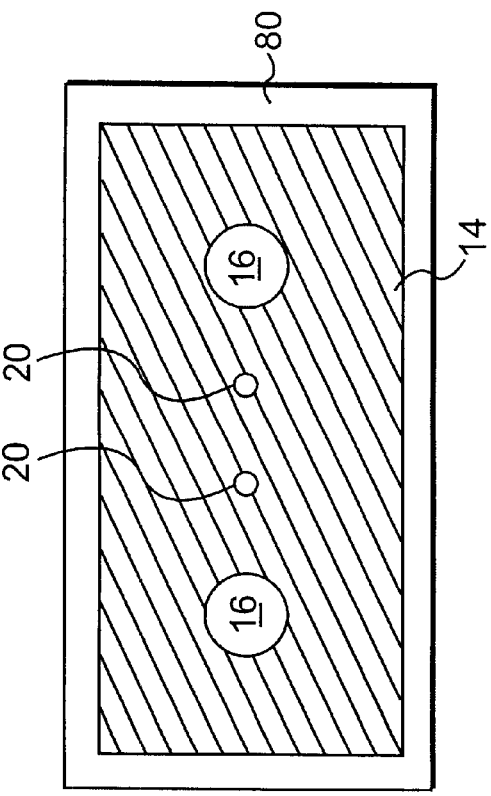
FIG. 4 is a front view of a prior art ferrule surrounded by a conventional housing.

FIG. 4 illustrates a front view of optical fiber cable ferrule 12 surrounded by housing 80. Contact face 14 is constrained in dimension by the interface with other ferrules and defines a physical aperture. The physical aperture of ferrule 12 in FIG. 4 is merely contact face 14, the front planar surface, of a rectangular-parallelpiped ferrule. It should be appreciated that in prior art devices, the physical aperture and the virtual aperture are identical.

Now that a prior art device has been described, we will turn to describing the preferred embodiment of an optical interconnect 10 and in particular to how the virtual aperture is modified to reduce EMI emissions. As seen clearly in FIG. 2, portions of the body of ferrule 30 are removed through extruding cuts 32, 32'. While several extruding cuts are illustrated, it should be appreciated that only one need be present. The other extruding cuts are illustrated by dashed lines to show that they are optional. Extruding cuts 32, 32' may be made in any direction, but preferably do not bisect any of optical fibers or waveguides 34 or guide pins 36. In an alternate embodiment, extruding cuts 32, 32' may be made to directly expose guide pins 36 or bisect waveguides 34. It should be appreciated that in this embodiment, guide pins 36 may be grounded or at least electrically accessed. Optical fibers 34 may be collected in a multi-fiber optical cable, a single fiber cable, a ribbon cable or remain bare at the end of ferrule 30 opposite contact face 38. In an alternate embodiment, at least two extruding cuts are separated by a distance of one-half wavelength of the EMI emission. This has the added advantage of a destructive interference being developed which may significantly reduce the magnitude of the EMI emission.

It should be appreciated that the drawings illustrate cuts 32, 32' after being made. In the operational device, it is preferable to substantially fill all cuts with a conductive material. The drawings do not illustrate this feature so that cuts 32, 32' are not obfuscated by the filled material.

The description generally refers to ferrules 30 of the invention being manufactured by a series of cuts being made in a typical ferrule 12. Making cuts is but one method to make ferrule 30, but is preferable only when ferrule 30 is made from a hard material, for example, but not limited to silicon. If ferrule 30 is made from a hard material, the cuts may be etched into ferrule 30 by any means known in the chemical and/or mechanical etching arts. After the cuts are made, they are later substantially filled with a conductive material.

Another method of manufacturing ferrules 30 is through an injection molding process. According to this process, ferrule 30 would be made of a moldable plastic. Preferably, the plastic would be filled with an additive, for example, but not limited to glass for rigidity, graphite for conductivity, or steel for rigidity and conductivity.

Another method for manufacturing ferrule 30 is to utilize a ceramic material. This ceramic material may be conventional in nature or may be an advanced composite. An example of such an advanced composite is taught in U.S. Pat. No. 4,000,110; by Kazumi et al. This reference is hereby incorporated in its entirety. This reference teaches that detailed ceramic products may be manufactured by the process of injection molding. First, suitable organic substances such as thermoplastic resin, thermosetting resin, lubricant and plasticizer is added to raw material of ceramics to render it a thermoplastic. Next, the shape of the article is produced by injecting the raw compound into a mold. Then, the added organic substances are subjected to thermal decomposition and evaporation. Finally, the raw mass is baked to harden into articles of complicated shape and high dimensional precision.

Another method of manufacturing ferrules 30 is through a die casting process. Die casting is a well known way of shaping articles in which a liquid material, such as molten metal, is placed in a cavity which is formed in the shape of the desired article between separable die members. The liquid material fills the die cavity and solidifies therein in the shape of the desired article. The die members are then separated and the article is removed from the die cavity. In pressure die casting, the liquid material is forced or injected into the die cavity under pressure.

The ferrules of this invention may also be constructed by taking one of ferrules 30 as mentioned above and filling the voids, i.e., the extruding cuts 32,32', with another material. The spaces may be filled with a conformable material, for example rubber or putty, that would assist the engagement of housing 60. The spaces may also be filled with a non-conformable plastic or polymer with a nylon base, preferably with glass added for increased rigidity. The spaces may also be filled with a conductive material, for example zinc and aluminum. It should be appreciated that the spaces may be filled by any of the methods describe above, in combination or singularly or by any other means. Filling the space with a non-conformable material would allow the ferrule to be used in conventional housings and is therefore the preferred method.

Figure 2:
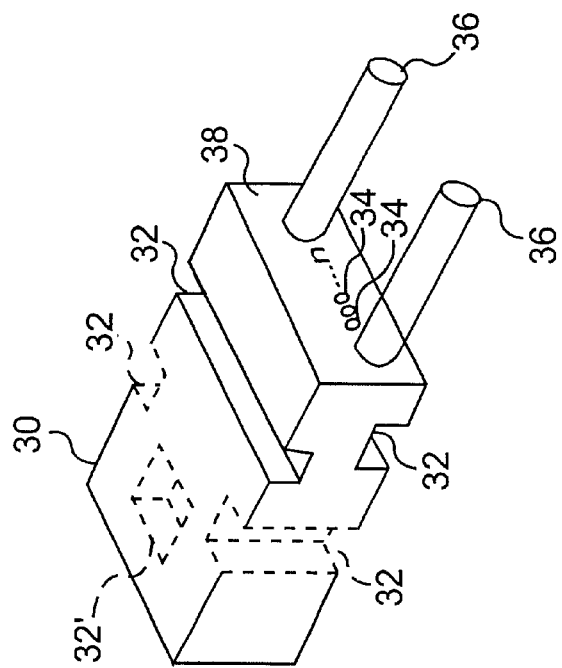
FIG. 2 is a perspective view of a ferrule constructed in accordance with a preferred embodiment of the invention.

FIG. 2 illustrates a cavity cut 32'. As may be seen, cavity cut 32' refers to cuts made in the direction of the y-axis that proceed entirely through ferrule 30, but that do not intersect fiber optic cable(s) 34 within the ferrule body. It should be appreciated that cavity cuts do not need to go through the ferrule body and then would be better described as box cuts.

Figure 3:
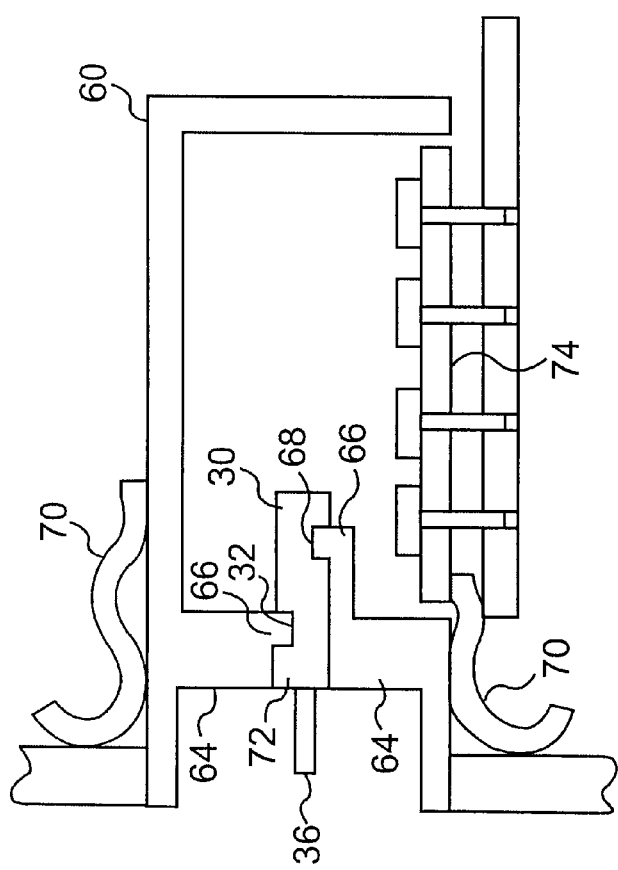
FIG. 3 is a side sectional view of a ferrule according to the present invention integral with a housing.

FIG. 3 illustrates housing 60 integral with ferrule 30 having guide pins 36. Housing 60 is manufactured with ferrule contact members 64 that terminate in space filling extensions 66 that cooperate with extruding cuts 32 made in ferrule 30. Housing 60 is preferably constructed of a molded plastic or polymer with a nylon base constructed via an injection molding process. The nylon could have glass or other material added for increased rigidity or conductivity. Housing 60 may also be a die cast zinc and aluminum composite or other metal. Housing 60 may be a conductor itself. Housing 60 may be constructed in either one part or multiple parts. Preferably, housing 60 is constructed as two parts that fit together in a clam shell arrangement. If constructed as one part, it may be necessary to alter cuts 32 to insure that ferrule 30 may be easily connected to housing 60. One way to insure connectivity when housing 60 is constructed of only one part is to use angled cuts 130, as illustrated in FIG. 8B, so that insertion of ferrule 30 does not strain housing 60. A pair of clips 70 grounds housing 60 to contact face 72 and aids in electrical conductivity. Clips 70 are preferably spring clips made of a high conductive metal, for example, but not limited to copper, aluminum, steel or an alloy. Housing 60 is open at the bottom so that a PC board 74 or other circuit board may be inserted. In an alternate embodiment, the bottom of housing 60 would be closed if a clam shell structure is utilized.

FIGS. 5A through 5C illustrate examples of virtual apertures 100, 100' and 100" of ferrules 38 resulting from modifications according to the present invention. Contact face 36 as shown in FIG. 3 remains intact but virtual apertures 100, 100' and 100" as shown in FIGS. 5A through 5C are decreased by the interaction between extruding cuts 32,32' and outer housing 60 which fills space left by extruding cuts 32. Virtual aperture 100, 100' and 100" defines the space through which an EMI wave may flow. Guide pins 36, if grounded, prevent the flow of EMI radiation through the space immediately surrounding guide pins 82. The largest physical dimension of vertical virtual aperture 100, 100' and 100" defines the largest wavelength of RF radiation that may escape through ferrule 12,30. Therefore, the smaller virtual aperture 100, 100' and 100" is made, the shorter the wavelength of the RF radiation there is to cause EMI with frequencies of concern. As may be seen, there is a significant difference in size and shape between physical aperture 14 and virtual aperture 100, 100' and 100". This is due to all of cuts 32,32' interacting to create the virtual aperture as illustrated in one plane as element 100, 100' and 100". While this concept may seem simple, it is not obvious. The prior art devices utilize structures that do not address the EMI problem and have avoided this issue. Applicant has found that by utilizing a more complex structure as described above, one is able to finally address this RMI problem.

In a standard ferrule known as the "MT ferrule," contact face 14 as shown in FIGS. 1 and 4 is 4.4 mm in the horizontal direction and 2.5 mm in the vertical direction and the diagonal is 5.1 mm. Guide pins 16 are 0.72 mm in diameter and 3.3 mm from the outer edge of one guide pin 16 to the outer edge of the other guide pin 16. Guide pins 16 are 3.4 mm measured along the diagonal and 2.6 mm from the center of one guide pin 16 to the center of the other guide pin 16.

The housing 60 of this invention is constructed to fill the spaces or cuts 68 made in ferrules 30 and to virtually wrap around fibers 34. The virtual wrapping effect is achieved by the coordination between housing 60 and ferrule 30. Because of the decreased virtual aperture 100, 100' and 100", the available space for RF radiation to pass through is also decreased. The only constraint on how much of ferrule 30 may be removed or how little of the ferrule body need be present is that fibers 34 can not be intersected.

Figure 6A:
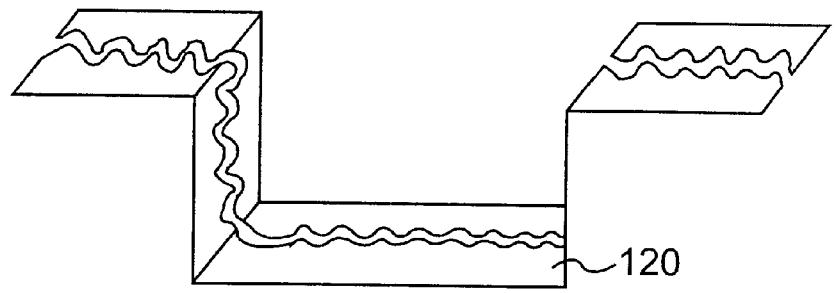
FIGS. 6A and 6B are sectional views of ferrules constructed in accordance with the teachings of the present invention.
Figure 6B:
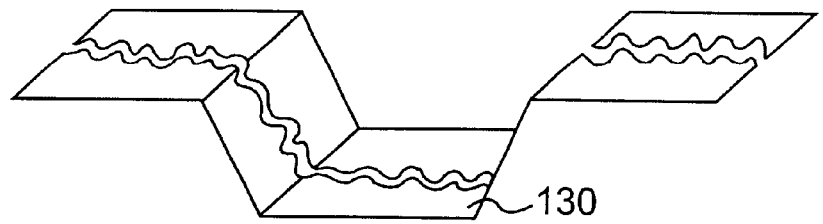

Extruding cuts 32 may take on several forms. FIG. 6A shows a typical box cut 120. FIG. 6B shows a typical angled cut 130. Both box cuts 120 and angled cuts 130 are preferably made in either direction perpendicular to the optical axis, but could be made parallel to the optical axis as well. FIG. 2 also shows a typical cavity cut 32'. Cavity cuts are preferably made in the direction of the y-axis, but could also be made in the direction of the x-axis or the optical axis. In a preferred embodiment of the invention, cuts 32 are staggered, as in FIG. 2, so as to maintain the structural integrity of ferrule 30. As may be seen, both box and angled cuts 120, 130 may extend to any desired depth and length as indicated by the break lines so long as fibers 34 are not intersected. Cavity cuts 32' may also not intersect fibers 34.

Figure 7:
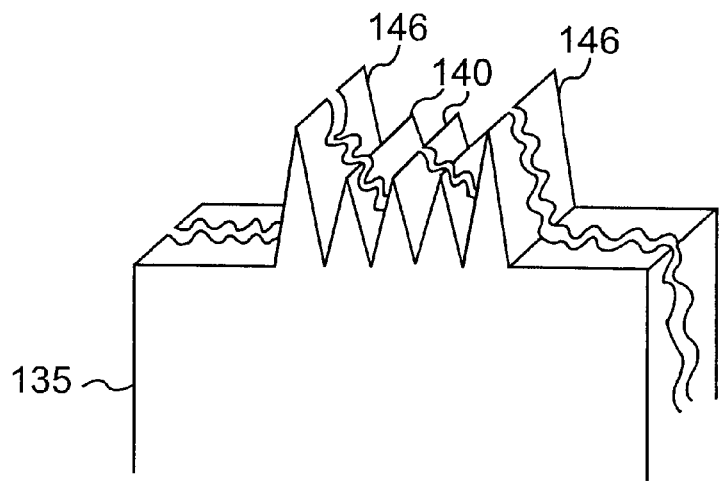
FIG. 7 is a front sectional view of ferrules constructed in accordance with the teachings of the present invention.

FIG. 7 shows a front sectional view of a differentiated serrated cut 135. Minor serrations 140 are cut to correspond with optical fibers 34 and major serrations 146 are cut to correspond with the guide pins 36. As may be seen, both minor and major serrations 140, 146 may extend to any desired height and width as indicated by the break lines so long as fibers 34 are not intersected.

Figure 8A:
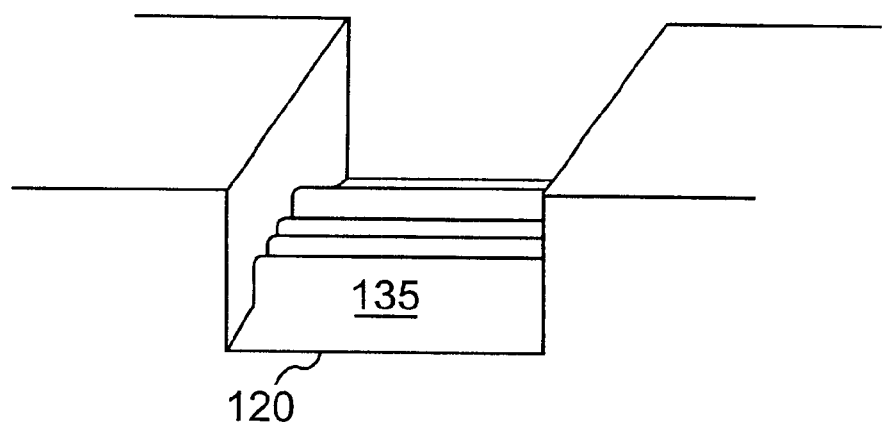
FIGS. 8A and 8B are side views of ferrules constructed in accordance with the teachings of the present invention.
Figure 8B:
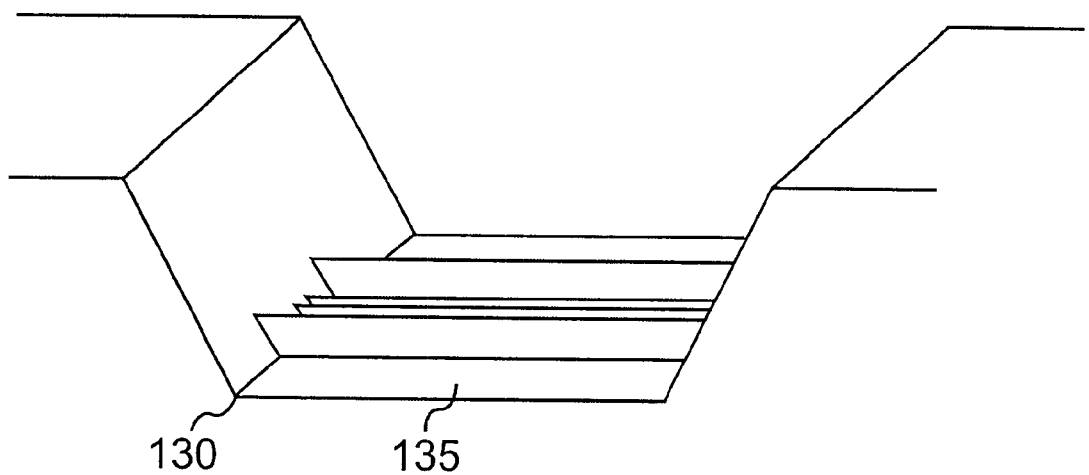

FIGS. 8A and 8B illustrate examples of multiple extruding cuts. FIG. 8A shows the result of box cut 120 perpendicular to the optical axis, i.e., normal to the x axis, and along the top or the bottom of ferrule 30 followed by a differentiated serrated cut 135 made parallel to the optical axis and in recess 68 left by the box cut. FIG. 8B shows the result of an angled cut 130 perpendicular to the optical axis, i.e., normal to the x axis, and along the top or the bottom of ferrule 30 followed up by a differentiated serrated cut 135 made parallel to the optical axis and in recess 68 left by the angled cut. Once box cut 120 or an angled cut 130 has been made, a further extruding cut or cuts 32 may be made in recess 68 of the first cut. It should be appreciated that while only three examples of extruding cuts 32 have been provided and that only three combinations of these cuts have been discussed, numerous types of extruding cuts are possible and any combination of these may be used to form ferrule 30.

While we have discussed that cuts 32, 32' do not contact waveguides 34, it should be appreciated that these cuts may contact and extend below waveguides 34. In this embodiment, waveguides 34 are supported in a cantilever fashion until conductive material is added to substantially fill cuts 32, 32'. It is preferred that unsupported span of waveguides 34 be minimized since this puts a strain on waveguides 34.

It should be appreciated that the teachings of this invention may be utilized in any MT connector, mini-MT connector, MTP connector, or any other connector having an aperture and sensitivity to EMI.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A ferrule having a body and comprising:
   one or more waveguides disposed substantially within said ferrule body;
   a contact face at a proximal end of said ferrule body, said contact face defining an area called a physical aperture; and
   one or more first extruding cuts within said ferrule body, said extruding cuts substantially filled with conductive material and thereby creating a virtual aperture which is less than said physical aperture.

2. The ferrule recited in claim 1, further comprising:
one or more guide pins extending from said contact face of said ferrule body.

3. The ferrule recited in claim 1, wherein at least one of said first extruding cuts is a first box cut.

4. The ferrule recited in claim 1, wherein at least one of said first extruding cuts is a first angled cut.

5. The ferrule recited in claim 1, wherein at least one of said first extruding cuts is a first cavity cut.

6. The ferrule recited in claim 1, wherein at least one of said first extruding cuts is a first differentiated serrated cut.

7. The ferrule recited in claim 1, wherein a recessed surface resulting from said first extruding cut is further pared by one or more second extruding cuts disposed in said recessed surface in a direction perpendicular to said one or more first extruding cuts.

8. The ferrule recited in claim 3, wherein a recessed surface resulting from said first box cut is further pared by a second differentiated serrated cut disposed in said recessed surface.

9. The ferrule recited in claim 4, wherein a recessed surface resulting from said first angled cuts is further pared by a second differentiated serrated cut disposed in said recessed surface.

10. The ferrule recited in claim 3, wherein a recessed surface resulting from said first box cut is further pared by one or more second box cuts said one or more second box cuts disposed in said recessed surface and being perpendicular to an axis of said first box cut.

11. The ferrule recited in claim 3, wherein a recessed surface resulting from said first box cut is further pared by one or more second angled cuts disposed in said recessed surface, said one or more second angled cuts perpendicular to an axis of said first box cuts.

12. The ferrule recited in claim 4, wherein a recessed surface resulting from said first angled cut is further pared by one or more second angled cuts disposed in said recessed surface, said one or more second angled cuts perpendicular to an axis of said first angled cut.

13. The ferrule recited in claim 4, wherein a recessed surface resulting from said first angled cut is further pared by one or more second box cuts disposed in said recessed surface, said one or more second box cuts perpendicular to an axis of said first angled cuts.

14. The ferrule recited in claim 3, wherein a recessed surface resulting from said first box cut is further pared by one or more second cavity cuts disposed in said recessed surface.

15. The ferrule of claim 4, wherein a recessed surface resulting from said first angled cut is further pared by one or more second cavity cuts disposed in said recessed surface.

16. A fiber optic ferrule, comprising:
one or more waveguides;
a contact face; and
a ferrule body containing said one or more waveguides, wherein said ferrule body contains a first extruding cut a first distance from said contact face and a second extruding cut a second distance from said contact face, said first distance not equal to said second distance, said extruding cuts substantially filled with conductive material and thereby creating a virtual aperture which is less than said physical aperture.

17. A fiber optic ferrule, comprising:
a physical aperture and a virtual aperture for RF signals, said virtual aperture smaller than said physical aperture.

18. An optical interconnect, comprising:
a partial outer enclosure; and
contact members extending inward, vertically from said partial outer enclosure, said contact members integrally engaged with a recess within a ferrule, said recess creating a virtual aperture for RF signals, said virtual aperture smaller than a physical aperture of said ferrule.

19. The optical interconnect recited in claim 18, further comprising:
a conductive metallic spring clip to ground said outer enclosure to a contact face of said ferrule.

20. The optical interconnect recited in claim 18, further comprising a PC board affixed to said partial outer enclosure to form a contiguous enclosure.

21. The ferrule of claim 1, wherein said ferrule body is one piece.

22. The fiber optic ferrule of claim 16, wherein said ferrule body is one piece.

23. The fiber optic ferrule of claim 17, wherein said fiber optic ferrule has a one piece ferrule body.

24. The optical interconnect of claim 18, wherein said ferrule has a one piece ferrule body.

\* \* \* \* \*